(12) United States Patent
Xu (10) Patent No.: US 10,466,763 B2
(45) Date of Patent: Nov. 5, 2019

(54) DYNAMIC VOLTAGE-FREQUENCY SCALING TO LIMIT POWER TRANSIENTS

(71) Applicant: NVIDIA Corporation, Santa Clara, CA (US)

(72) Inventor: Shuang Xu, Shenzhen (CN)

(73) Assignee: Nvidia Corporation, Santa Clara, CA (US)

( * ) Notice: Subject to any disclaimer, the term of this patent is extended or adjusted under 35 U.S.C. 154(b) by 492 days.

(21) Appl. No.: 14/094,221

(22) Filed: Dec. 2, 2013

(65) Prior Publication Data

US 2015/0153805 A1 Jun. 4, 2015

(51) Int. Cl.
*G06F 1/32* (2019.01)
*G06F 1/324* (2019.01)
*G06F 1/3203* (2019.01)

(52) U.S. Cl.
CPC ............ *G06F 1/324* (2013.01); *G06F 1/3203* (2013.01); *Y02D 10/126* (2018.01); *Y02D 10/172* (2018.01)

(58) Field of Classification Search
CPC ....................................................... G06F 1/324
USPC ......................................................... 713/322
See application file for complete search history.

(56) References Cited

U.S. PATENT DOCUMENTS

| | | | | |
|---|---|---|---|---|
| 4,958,269 A * | 9/1990 | Gritter | ................... | H02P 27/08 318/801 |
| 5,130,561 A * | 7/1992 | Elliott | ................... | H02M 1/14 307/31 |
| 5,272,649 A | 12/1993 | Campbell et al. | | |
| 5,275,919 A | 1/1994 | Kawatsuji et al. | | |
| 5,396,642 A * | 3/1995 | Blais | ................... | H04K 3/41 348/E7.065 |
| 5,542,240 A | 8/1996 | Snider et al. | | |
| 5,760,636 A * | 6/1998 | Noble | ................... | G06F 1/08 307/117 |
| 5,809,097 A * | 9/1998 | Lakshmikumar | ....... | H03L 7/081 329/303 |
| 5,850,422 A * | 12/1998 | Chen | ................... | H03L 7/07 375/371 |
| 5,889,529 A | 3/1999 | Jones et al. | | |
| 6,157,247 A | 12/2000 | Abdesselem et al. | | |
| 6,272,649 B1 | 8/2001 | Hayward et al. | | |
| 6,275,919 B1 | 8/2001 | Johnson | | |
| 6,313,675 B1 * | 11/2001 | Naffziger | ............. | H03L 7/0812 327/156 |
| 6,549,240 B1 | 4/2003 | Reitmeier | | |
| 6,690,139 B1 * | 2/2004 | Seibel | ................. | H02P 21/0021 318/448 |
| 6,985,025 B1 | 1/2006 | Maksimovic et al. | | |
| 7,024,568 B2 | 4/2006 | Maksimovic et al. | | |
| 7,061,292 B2 | 6/2006 | Maksimovic et al. | | |

(Continued)

FOREIGN PATENT DOCUMENTS

DE 102011102238 12/2011
GB 2481492 12/2011

*Primary Examiner* — Volvick Derose (57) ABSTRACT

A clocked electronic device includes first and second control systems. The first control system is configured to decrease clock frequency in the device in response to decreasing supply voltage. The second control system is responsive to clock lag in the device and to an amount of current drawn through the device. It is configured to increase the supply voltage in response to increasing clock lag, but to decrease the supply voltage when the current drawn through the device exceeds an operational threshold.

14 Claims, 6 Drawing Sheets

(56) References Cited

U.S. PATENT DOCUMENTS

| | | | |
|---|---|---|---|
| 7,080,271 B2 | 7/2006 | Kardach et al. | |
| 7,095,288 B2 | 8/2006 | Smith | |
| 7,129,763 B1 | 10/2006 | Bennett et al. | |
| 7,149,903 B1 | 12/2006 | Chan et al. | |
| 7,501,868 B2 | 3/2009 | Ito | |
| 7,506,189 B1* | 3/2009 | Lee | G06F 1/3203 713/300 |
| 7,521,973 B1* | 4/2009 | Anemikos | G06F 1/10 327/144 |
| 7,525,293 B1* | 4/2009 | Notohamiprodjo | H02M 1/425 315/219 |
| 7,574,613 B2 | 8/2009 | Holle et al. | |
| 7,627,730 B1 | 12/2009 | Moll | |
| 7,839,410 B2 | 11/2010 | Brown et al. | |
| 8,055,871 B1 | 11/2011 | Schulze et al. | |
| 8,125,261 B2 | 2/2012 | Nomura | |
| 8,134,356 B2 | 3/2012 | Dobberpuhl et al. | |
| 8,193,798 B1* | 6/2012 | Pace | H02M 3/156 323/284 |
| 8,593,197 B1* | 11/2013 | Cheng | H03L 7/0812 327/149 |
| 8,656,198 B2 | 2/2014 | Branover et al. | |
| 2001/0052103 A1* | 12/2001 | Hirofuji | H03M 13/1515 714/781 |
| 2002/0024828 A1* | 2/2002 | Hayashi | H02M 5/4505 363/35 |
| 2002/0116650 A1* | 8/2002 | Halepete | G06F 1/08 713/300 |
| 2002/0126751 A1 | 9/2002 | Scheurich et al. | |
| 2002/0196075 A1* | 12/2002 | Thorp | H03K 17/162 327/552 |
| 2003/0004921 A1 | 1/2003 | Schroeder | |
| 2003/0030483 A1 | 2/2003 | Seki et al. | |
| 2003/0126474 A1* | 7/2003 | Sawyers | G06F 1/30 713/300 |
| 2003/0156639 A1 | 8/2003 | Liang | |
| 2004/0057324 A1* | 3/2004 | Abe | G11C 5/147 365/232 |
| 2004/0103330 A1* | 5/2004 | Bonnett | G06F 1/3203 713/322 |
| 2004/0123171 A1* | 6/2004 | Zhang | G06F 1/206 713/322 |
| 2004/0240599 A1* | 12/2004 | Takasoh | H03L 7/0898 375/376 |
| 2005/0021656 A1 | 1/2005 | Callegari | |
| 2005/0024155 A1* | 2/2005 | Huang | H03D 13/004 331/25 |
| 2005/0036246 A1* | 2/2005 | Nagata | G05F 1/573 361/18 |
| 2005/0057314 A1* | 3/2005 | Hsu | H03L 7/091 331/25 |
| 2005/0057551 A1 | 3/2005 | Gong et al. | |
| 2005/0271361 A1 | 12/2005 | Aoki et al. | |
| 2006/0097795 A1* | 5/2006 | Sohn | H03L 7/0812 331/16 |
| 2006/0132208 A1* | 6/2006 | Park | H03L 7/087 327/182 |
| 2006/0232316 A1* | 10/2006 | Nomura | G06F 1/10 327/291 |
| 2006/0246895 A1 | 11/2006 | Ryu | |
| 2006/0284657 A1* | 12/2006 | Park | H03K 3/0315 327/156 |
| 2007/0001697 A1* | 1/2007 | Dobberpuhl | G06F 1/3203 324/750.3 |
| 2007/0013427 A1* | 1/2007 | Nomura | H03K 5/1504 327/276 |
| 2007/0206018 A1 | 9/2007 | Bajic et al. | |
| 2007/0220289 A1 | 9/2007 | Holle et al. | |
| 2007/0234088 A1 | 10/2007 | Marshall et al. | |
| 2007/0285082 A1* | 12/2007 | Kimura | H03L 7/0891 324/76.77 |
| 2007/0288769 A1* | 12/2007 | Chang | G06F 1/206 713/300 |
| 2008/0063128 A1* | 3/2008 | Chatwin | H03D 13/004 375/375 |
| 2008/0204158 A1 | 8/2008 | Weder | |
| 2009/0049314 A1* | 2/2009 | Taha | G06F 1/3203 713/300 |
| 2009/0077402 A1* | 3/2009 | Huang | G06F 1/3203 713/320 |
| 2009/0160254 A1* | 6/2009 | Wu | H02J 9/062 307/66 |
| 2009/0177422 A1* | 7/2009 | Cox | G06F 1/3203 702/64 |
| 2009/0204830 A1 | 8/2009 | Frid et al. | |
| 2010/0019818 A1* | 1/2010 | Priel | G06F 1/08 327/276 |
| 2010/0019834 A1 | 1/2010 | Zerbe et al. | |
| 2010/0090738 A1* | 4/2010 | Changchein | G06F 1/10 327/170 |
| 2010/0095137 A1* | 4/2010 | Bieswanger | G06F 1/3203 713/300 |
| 2010/0182055 A1* | 7/2010 | Rozen | G06F 1/04 327/155 |
| 2010/0208500 A1* | 8/2010 | Yan | H02M 3/33523 363/21.12 |
| 2010/0250972 A1 | 9/2010 | Freitas | |
| 2010/0318828 A1 | 12/2010 | Elting et al. | |
| 2011/0032008 A1* | 2/2011 | Zhao | H03K 7/08 327/114 |
| 2011/0110000 A1* | 5/2011 | Etter | H02M 1/32 361/18 |
| 2011/0156776 A1* | 6/2011 | Kizer | G06F 1/10 327/156 |
| 2011/0181325 A1* | 7/2011 | May | G06F 1/06 327/141 |
| 2011/0320839 A1 | 12/2011 | David et al. | |
| 2012/0030481 A1* | 2/2012 | Bose | G06F 1/3206 713/300 |
| 2012/0054519 A1 | 3/2012 | Branover et al. | |
| 2012/0105452 A1 | 5/2012 | Diard | |
| 2012/0110351 A1 | 5/2012 | Raju et al. | |
| 2012/0188233 A1 | 7/2012 | Shuster et al. | |
| 2012/0223940 A1 | 9/2012 | Dunstan et al. | |
| 2012/0306877 A1 | 12/2012 | Rosasco | |
| 2013/0002838 A1 | 1/2013 | Takenaka | |
| 2013/0013247 A1* | 1/2013 | Sato | G01R 31/2884 702/117 |
| 2013/0035797 A1* | 2/2013 | Allen-Ware | G06F 1/324 700/286 |
| 2013/0057235 A1* | 3/2013 | Zizzo | H02M 5/12 323/255 |
| 2013/0097443 A1 | 4/2013 | Li et al. | |
| 2013/0120047 A1* | 5/2013 | Dally | H03H 11/265 327/276 |
| 2013/0179711 A1 | 7/2013 | Aelion et al. | |
| 2013/0212417 A1 | 8/2013 | Frid et al. | |
| 2014/0016362 A1* | 1/2014 | Adragna | H02M 3/3376 363/21.02 |
| 2014/0032947 A1 | 1/2014 | Ahmad et al. | |
| 2014/0043333 A1 | 2/2014 | Narayanan et al. | |
| 2014/0068285 A1* | 3/2014 | Lee | G06F 1/324 713/300 |
| 2014/0111180 A1* | 4/2014 | Vladan | H04L 12/413 323/312 |
| 2014/0184626 A1 | 7/2014 | Narayanan et al. | |
| 2014/0266460 A1* | 9/2014 | Nobbe | H03F 1/0261 330/295 |
| 2014/0328090 A1* | 11/2014 | Takahashi | H02M 3/33507 363/21.17 |
| 2015/0022272 A1 | 1/2015 | Felix et al. | |
| 2015/0049519 A1* | 2/2015 | Izadian | H02M 1/08 363/21.02 |

* cited by examiner

FIG. 6

DYNAMIC VOLTAGE-FREQUENCY SCALING TO LIMIT POWER TRANSIENTS

BACKGROUND

An electronic device may be designed to sustain a maximum level of power dissipation over a given period of time. In many cases, the device may be rated for a continuous average power dissipation as well as a short-term, peak power dissipation. In this disclosure, the continuous average power-dissipation rating is referred to as the thermal design power (TDP), and the peak power-dissipation rating is referred to as the electronic design power (EDP). An electronic device may be damaged when TDP is exceeded for an extended period of time, or when EDP is exceeded for even a short period of time. Accordingly, components that distribute power in the device must be rated for TDP over the long term and EDP over the short term.

Due to the principle of thermal inertia, EDP may be significantly greater than TDP. In one non-limiting example, a digital processor for mobile computing may have a TDP corresponding to 4.5 amperes (A) at a given power-supply voltage, but an EDP corresponding to 9 A at the same power-supply voltage. This presents a practical disadvantage in that the power-handling components of the device— the battery, power transistors, inductor, etc.—which sink no more than 4.5 A on average, must also be configured to handle up to 9 A for periods of, perhaps, microseconds.

The inventor herein has observed that power-handling components robust enough to survive current transients at a higher EDP may significantly increase the size and cost of an electronic device rated for a lower TDP, especially in the high-speed computing arena. Accordingly, a series of approaches will now be disclosed which uses the principle of dynamic voltage-frequency scaling (DVFS) to push the EDP of an electronic device closer to TDP, and thereby reduce the degree of overdesign required for high-current transients.

BRIEF DESCRIPTION OF THE DRAWINGS

This disclosure will be better understood from reading the following Detailed Description with reference to the attached drawing figures, wherein.

DETAILED DESCRIPTION

Aspects of this disclosure will now be described by example and with reference to the illustrated embodiments listed above. Components, process steps, and other elements that may be substantially the same in one or more embodiments are identified coordinately and described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
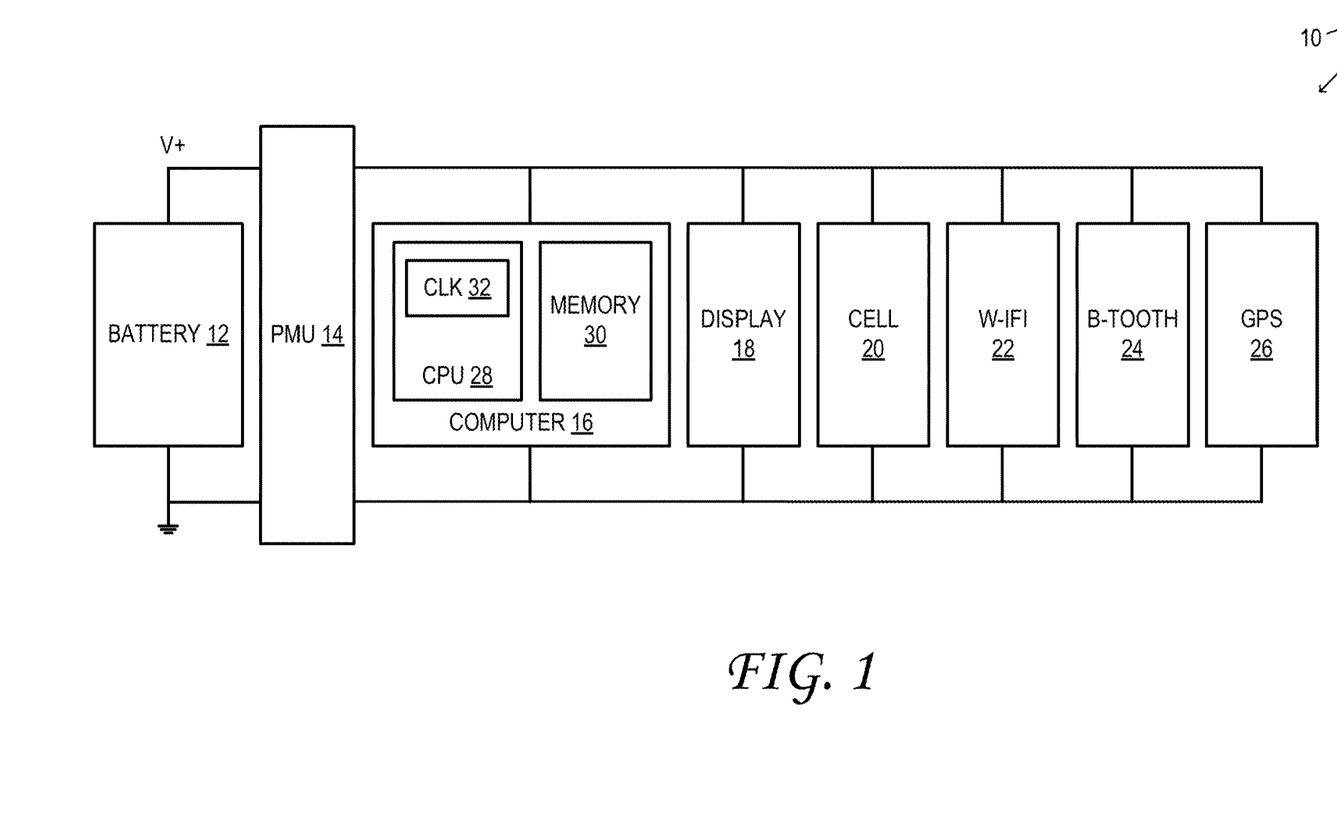
FIG. 1 shows aspects of an example electronic device in accordance with an embodiment of this disclosure.

FIG. 1 shows aspects of an example electronic device 10 in one, non-limiting embodiment. The electronic device may be a smartphone, portable game system, tablet, or laptop computer, for example. As such, device 10 draws power from a rechargeable battery 12, through power-management unit (PMU) 14. Described in further detail hereinafter, the PMU includes analog and digital componentry configured to receive electric power from the battery and to offer such power at voltages appropriate for powering the various component modules of the device. In the illustrated embodiment, such modules include computer 16, display 18, cellular radio 20, Wi-Fi radio 22, Bluetooth radio 24, and global-positioning system (GPS) receiver 26.

Computer 16 includes CPU 28 and memory 30, and may also include various other components not shown in the drawings—e.g., a memory manager, system bus, graphics processing unit (GPU), etc. The CPU may be a modern, multi-core CPU in some embodiments. Memory 30A may include volatile and non-volatile memory for storing code and data. The memory may conform to a typical hierarchy of static and/or dynamic random-access memory (RAM), read-only memory (ROM), magnetic, and/or optical storage.

No aspect of FIG. 1 or of the other drawing figures should be interpreted in a limiting sense, for numerous other variants lie fully within the spirit and scope of this disclosure. It is not necessary, for instance, that every component module in FIG. 1 be included in every device embodiment. Moreover, some electronic devices may include component modules not shown in the drawings. Although the electronic device represented in FIG. 1 is a battery-powered device, this disclosure is fully applicable to line- and solar-powered devices as well.

Continuing in FIG. 1, battery 12, PMU 14, and the components thereof (power transistors, inductors, etc.) may each exhibit a thermal design power (TDP) rating as well as an electronic design power (EDP) rating. As noted above, a practical disadvantage exists for electronic devices in which EDP is much greater than TDP. Such devices must be overdesigned to survive very brief power transients near EDP, even though the average power dissipation may never exceed the lower TDP value. Such overdesign is costly and may require the use of physically larger components that add weight and increase packing complexity in an electronic device.

Figure 2:
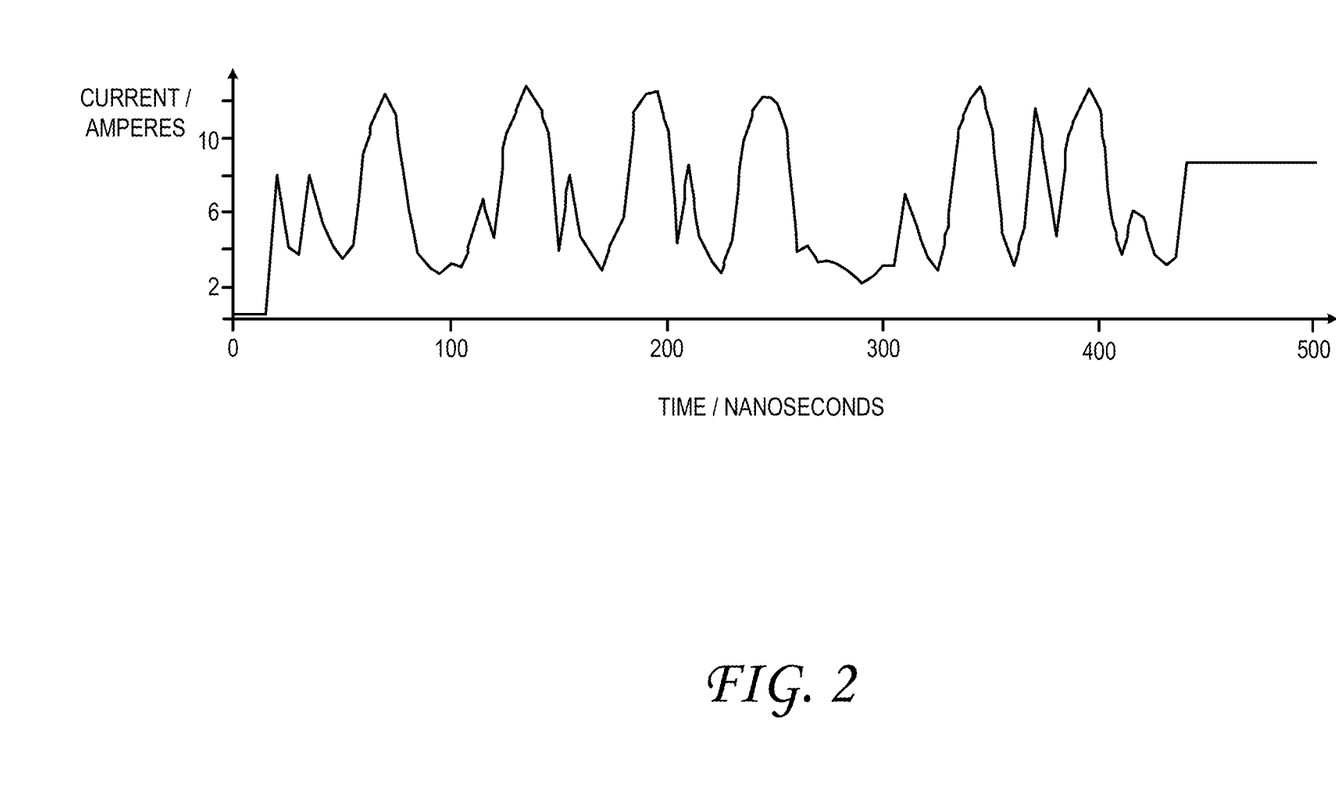
FIG. 2 shows example current versus time data for an electronic device prior to application of the transient-suppression approaches described herein.

In devices operating over a narrow range of supply voltages, any difference between TDP and EDP is due to current transients. For many computing devices, current transients are due mainly to stochastic processor activity. In other words, the various processor cores of CPU 28 (or a GPU, if included) will naturally encounter instructions of varying complexity. During intervals when one or more cores are executing relatively complex instructions (e.g., floating-point instructions), a current transient may occur due to compounded leakage current in the logic gates of the affected cores. Such current transients may require power delivery that significantly exceeds TDP for periods of microseconds, in some scenarios. One such scenario is represented in the graph of FIG. 2, where supply current versus time is plotted for an example state-of-the-art digital signal processor from NVIDIA Corporation of Santa Clara, Calif.

Returning now to FIG. 1, current transients from CPU 28 may be reduced in magnitude by dynamically lowering the frequency of CPU clock 32 during the transient. This remedy is based on the fact that the processor cores of the CPU may include primarily CMOS logic gates, and that the leakage current of a CMOS logic gate scales linearly with clock frequency. Supply current may scale with clock frequency in other logic families as well. In some time domains, clock-frequency reduction during a current transient may be enacted in software. This approach may not be applicable, however, to current transients that occur on the timescale of microseconds, or less than one microsecond. Nevertheless, results from FIG. 2 show that significant current transients do occur on the microsecond timescale in mobile computing devices operating at state-of-the-art clock frequencies. Accordingly, a different approach to reducing the magnitude of current transients in a clocked electronic device is presented herein. This approach leverages the useful method of dynamic voltage-frequency scaling (DVFS), as described hereinafter with reference to FIG. 3.

Figure 3:
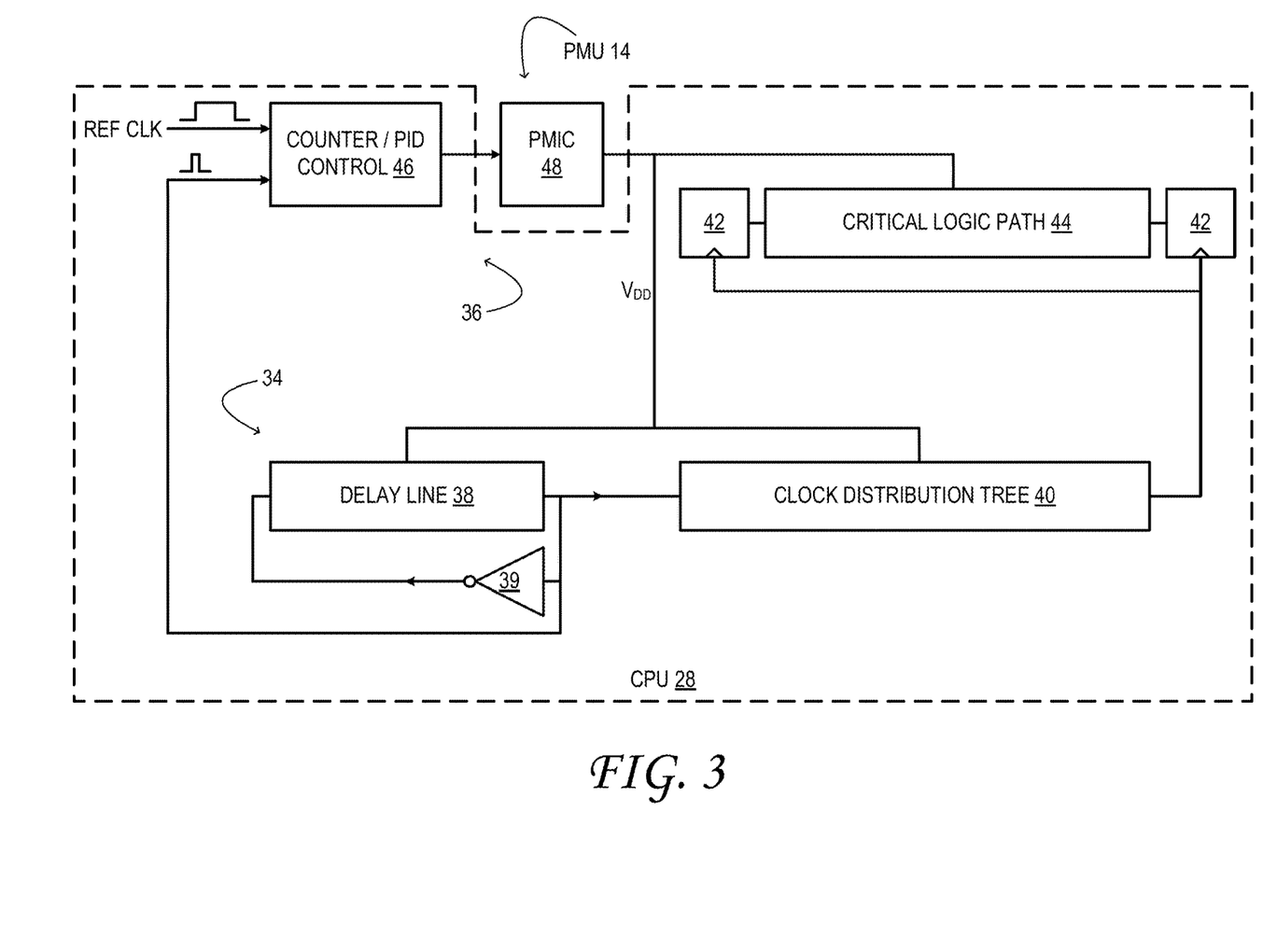
FIG. 3 shows aspects of an example power-management unit (PMU) and aspects of an example central processing unit (CPU) of an electronic device in accordance with an embodiment of this disclosure.

FIG. 3 shows aspects of an example PMU 14 and aspects of an example CPU 28 of electronic device 10. The configuration represented in FIG. 3 embodies a first control system 34 and a second control system 36. The first control system is effectively a high-frequency voltage-controlled oscillator (VCO), which generates the primary clock-pulse train for CPU 28. To this end, the first control system includes a voltage-controlled delay line 38 in the feedback path of inverter 39. The clock-pulse train is delivered to clock distribution tree 40 of the CPU, and from there to the various processor stages 42. In the embodiment of FIG. 3, independently clocked processor stages bracket a so-called critical (or rate-limiting) logic path 44.

In the illustrated embodiment, the supply voltage $V_{DD}$ is used as the control voltage for voltage-controlled delay line 38. Thus, the frequency of the first control-system VCO varies monotonically (e.g., linearly, quadratically, etc.) with supply voltage. Accordingly, first control system 34 may be configured to decrease clock frequency in electronic device 10 in response to decreasing supply voltage, and to increase clock frequency in the electronic device in response to increasing supply voltage. This approach recognizes that the maximum clock frequency a modern logic system can stably support is a sensitive function of the supply voltage—viz., higher supply voltages enabling greater clock frequencies and lower supply voltages requiring lower clock frequencies for stable operation. With the VCO clock frequency tied to $V_{DD}$, first control system 34 may be configured to dynamically provide the highest appropriate clock frequency to CPU 28, despite fluctuations in supply voltage.

Continuing in FIG. 3, the magnitude of the supply voltage to electronic device 10 is controlled by second control system 36. The second control system is tasked with enacting a power-management strategy in the electronic device in a manner that also protects clock-phase purity in the device. To this end, the second control system includes a counter and proportional integral/derivative (PID) control unit 46 and a power-management integrated circuit (PMIC) 48. The counter-and-PID control unit receives as input the clock-pulse train from first control system 34 as well as a stable, external reference clock of lower frequency than the clock-pulse train. Counter logic within the counter-and-PID control unit divides the clock frequency by an appropriate amount and compares the divided clock frequency to the reference-clock frequency. The degree of lag or overshoot of the divided clock frequency with respect to the reference-clock frequency is used to compute appropriate PID parameters, which are passed into the PMIC for use in re-computing the target supply voltage. In this manner, second control system 36 is configured to compensate for clock lag or overshoot in the electronic device—viz., by increasing the supply voltage in response to increasing clock lag and decreasing the supply voltage in response to clock overshoot. First control system 34 then responds by raising the clock frequency in response to increased supply voltage, and lowering the clock frequency in response to decreased supply voltage, which minimizes both clock lag and overshoot.

Figure 4:
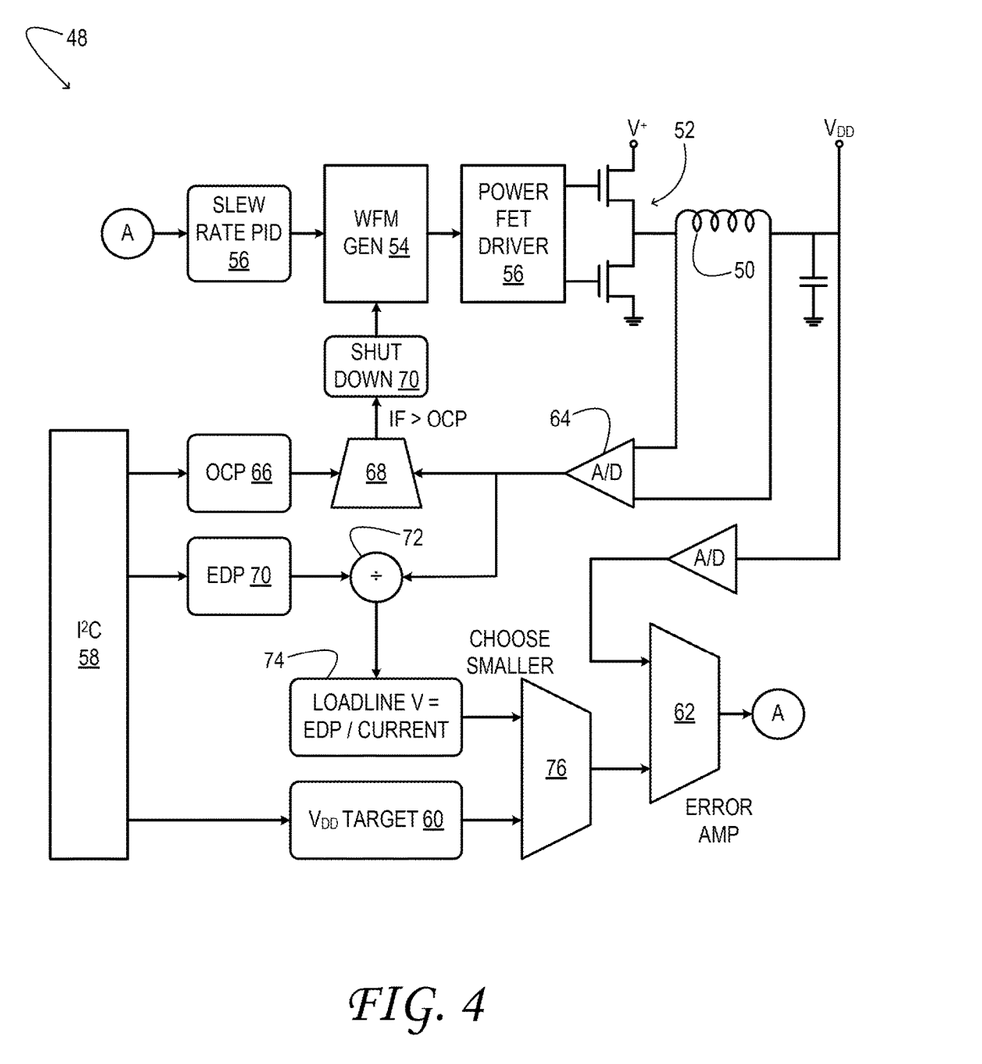
FIG. 4 shows aspects of an example power-management integrated circuit (PMIC) in accordance with an embodiment of this disclosure.

FIG. 4 shows aspects of an example PMIC 48 in one, non-limiting embodiment. Voltage regulation in the PMIC is enacted via a state-of-the-art switching mechanism in which a buck inductor 50 is subject to periodic charge and discharge through a pair of power field-effect transistors (FETs) 52. The voltage is regulated via closed-loop control of the ON/OFF duty cycle of the transistors, which is determined by the waveform output of waveform generator 54. In the illustrated embodiment, the waveform generator biases the gates of the power FETs through power-FET driver 56. The waveform generator, in turn, is controlled via slew-rate PID parameter 56, as further described below.

Continuing in FIG. 4, the illustrated PMIC 48 includes an I²C interface 58, which is programmable through CPU 28. The I²C interface supplies various parameters to the PMIC, which include a target supply voltage parameter 60. In some operating modes—e.g., a mode in which the instantaneous power dissipation is below TDP—the target supply voltage parameter passes through to error amplifier 62. The error amplifier computes the difference between the actual supply voltage $V_{DD}$ and the target supply voltage parameter. This difference, expressed in terms of suitable PID parameters, is used to modify the slew rate PID parameters 56, and thereby adjust the supply voltage to the target value. In this manner, PMIC 48 of second control system 36 regulates the supply voltage $V_{DD}$ against fluctuations in load and battery state. Moreover, in cooperation with first control system 34, the second control system enables closed-loop DVFS in the electronic device 10.

In the embodiment of FIG. 4, PMIC 48 also includes current monitor 64, which is responsive to the amount of current drawn through electronic device 10. In particular, the current monitor computes the instantaneous current drawn from the PMIC and compares such current to an over-current protection (OCP) threshold 66, also supplied through I²C interface 58. If the instantaneous current exceeds the OCP threshold—which could indicate a short-circuit or thermal runaway condition—shut-down comparator 68 asserts shut-down signal 70, which instructs waveform generator 54 to null the supply voltage and thereby prevent further damage to electronic device 10.

The PMIC componentry described thus far provides supply voltage regulation and over-current protection in a manner consistent with controlling clock-phase purity. Furthermore, PMIC 48 includes additional features that leverage the DVFS control structure to reduce the magnitude of power transients in electronic device 10. By reducing the magnitude of the power transients, the EDP of the electronic device is moved closer to TDP, which reduces the level of overdesign needed to handle the power transients. This provides reduced system cost and better packing efficiency.

Continuing, now, in FIG. 4, I²C interface 58 is also configured to supply an EDP threshold 70 to PMIC 48.

Division component 72 is configured to divide the EDP threshold by the output of current-monitoring component 64. The quotient 74 from division component 72 has units of voltage and represents a load-line voltage, which, if used as a replacement supply-voltage target, would limit the instantaneous power dissipation in the device to the value of EDP, even prior to the resulting reduction in current. Via selection component 76, this load-line voltage is selected only if it is less than the target voltage supplied through the I²C interface. In other words, the voltage selected by the selection component is the smaller of the load-line voltage and a target supply voltage of the device. The selection component passes the selected voltage to downstream componentry of PMIC, which regulates the supply voltage at the selected voltage level. It will be noted that the load-line voltage, when selected, replaces the target supply voltage as the control set point, but only as long as it remains less than the target supply voltage parameter.

In the manner described above, PMIC 48 of second control system 36 is configured to decrease the supply voltage when the current exceeds an operational threshold. In the illustrated embodiment, the operational threshold is equal to the EDP threshold divided by the target supply voltage for the device. Accordingly, the supply voltage is decreased to a point at which instantaneous power dissipation in the device is below the EDP threshold.

Figure 5:
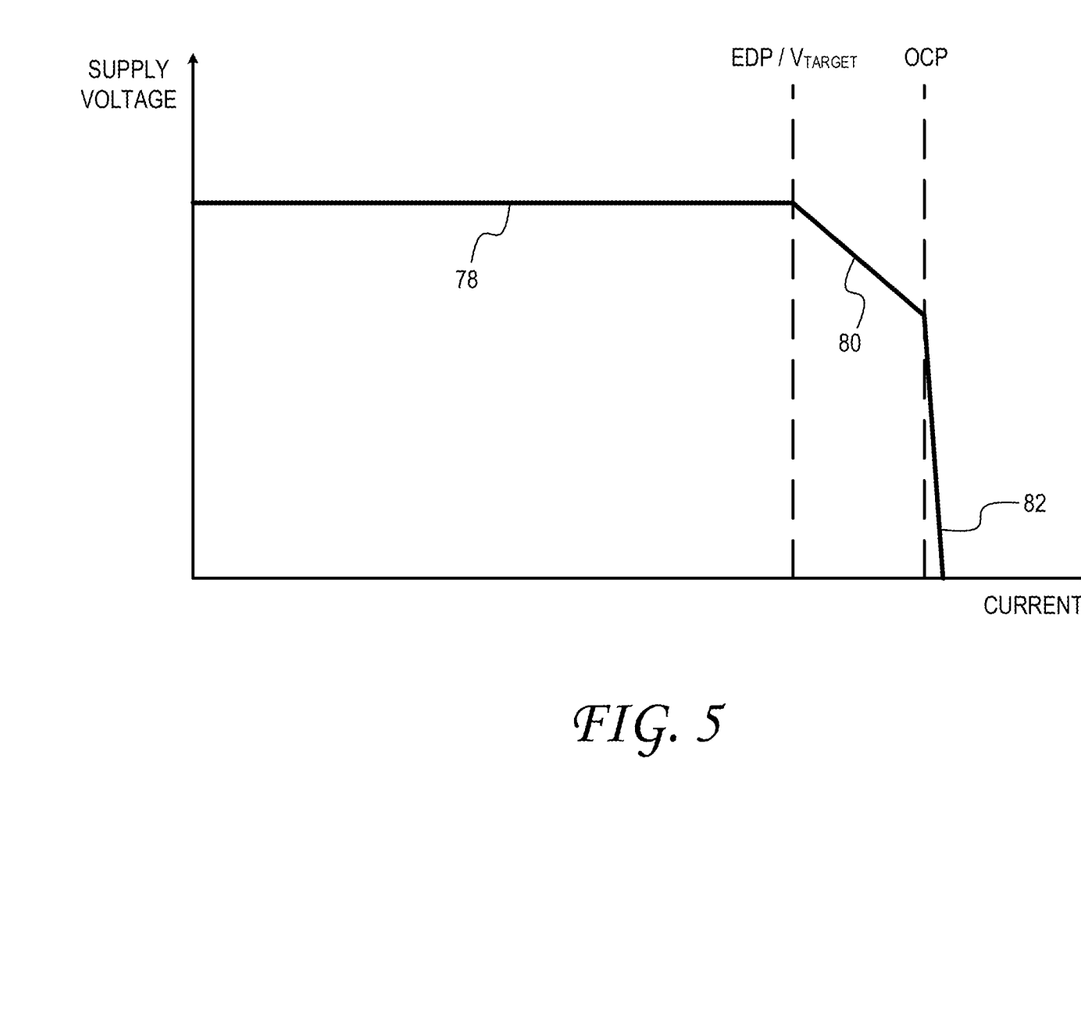
FIG. 5 shows a graph of supply voltage plotted against instantaneous supply current for an electronic device in accordance with an embodiment of this disclosure.

A typical result of this control strategy is shown in the graph of FIG. 5, where supply voltage $V_{DD}$ is plotted against the instantaneous current drawn through device 10. In region 78, the device is operating below the EDP limit. Here, the load-line voltage 74 exceeds target supply voltage 60, and so the voltage the supply voltage is regulated to the target level. In region 80, however, the device is drawing current of such magnitude that EDP would be exceeded if the supply voltage were maintained at the target level. Accordingly, the load-line voltage 74 is less than the target supply voltage 60, and the supply voltage is regulated at this reduced level. In this region, the supply voltage is decreased in response to increasing current subject to a load line on which the instantaneous power dissipation in the device approaches (or equals) the EDP threshold. The load line extends, in current space, from the operational threshold noted above to an instantaneous OCP rating of the device. In region 82, the current exceeds the OCP threshold, and so the supply voltage is further decreased and abruptly nulled, causing power dissipation in the device to cease.

It will be clear from the foregoing description that supply-voltage reduction is not the only mechanism of power-transient suppression offered by the above configurations. Turning back to FIG. 3, the decrease in supply voltage on regulation to the load-line voltage is quickly sensed in voltage-controlled delay line 38, which lowers the clock frequency according to a predetermined function. As leakage current scales linearly with clock frequency, the current drawn through the device will be further reduced, which effectively quells the power transient, typically on a timescale of nanoseconds. After the transient is over, selection component 76 will typically resume selection of the target supply voltage for regulation in PMIC 48.

In view of the foregoing description, the skilled reader will note that the ability of second control system 36 to control clock lag is not compromised by its transient-suppression activity. Rather, the second control system is configured to increase the supply voltage in response to increasing clock lag over a first time domain (e.g., milliseconds and longer), but to decrease the supply voltage over a second, shorter time domain (e.g., tens of microseconds or less) when the current exceeds the operational threshold. In some embodiments, the decrease in supply voltage may be enacted less than one clock cycle after the current exceeds the operational threshold.

The configurations described above enable various methods to suppress power transients in an electronic device. Accordingly, some such methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke a complex decision-making logic. Such logic is fully contemplated. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 6:
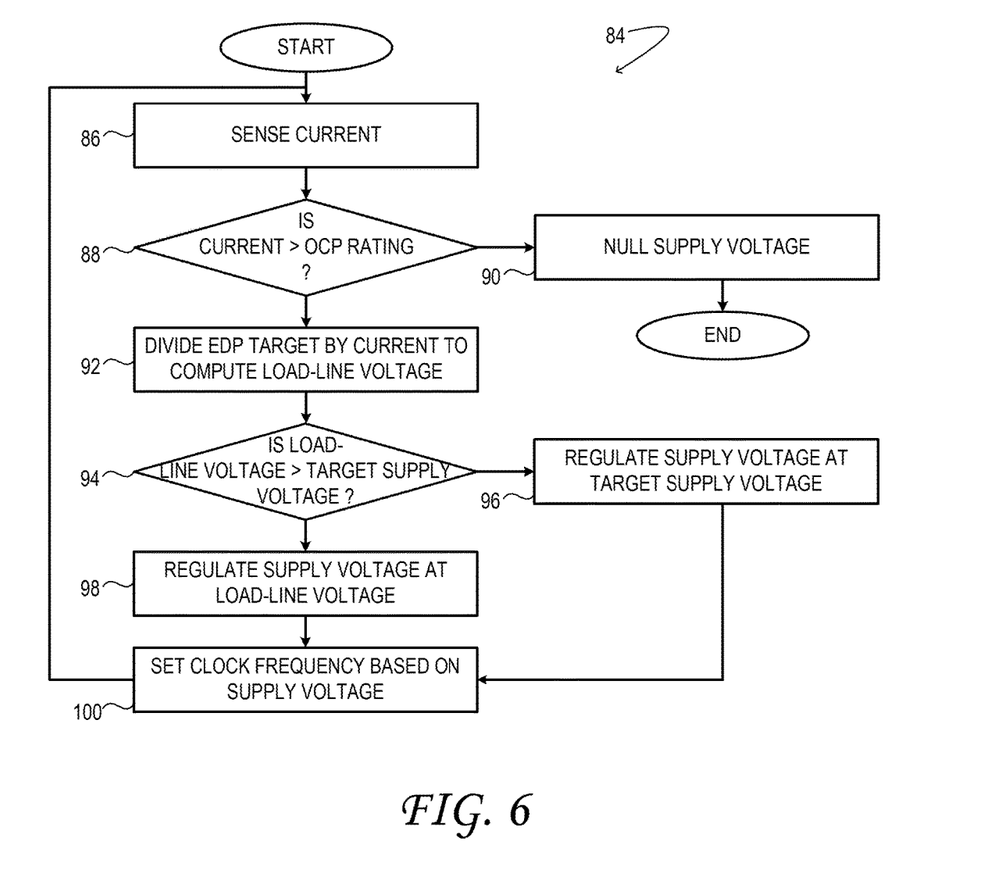
FIG. 6 illustrates an example method to suppress power transients in an electronic device, in accordance with an embodiment of this disclosure.

FIG. 6 illustrates an example DVFS method 84 to be enacted in a clocked electronic device. This method may be used to suppress power transients in the device. At 86 of method 84, the current drawn through the electronic device is sensed. The current may be sensed as a voltage across a buck inductor associated with a PMIC, as described hereinabove, or in any other suitable manner.

At 88 it is determined whether the sensed current exceeds an OCP rating for the device. If the current exceeds the OCP rating, then execution of the method proceeds to 90, where the supply voltage to the device is nulled. However, if the current does not exceed the OCP rating, then the method advances to 92 and to subsequent steps, where the sensed current is compared to an operational threshold. In the embodiment illustrated in FIG. 6, an EDP threshold for the device is divided, at 92, by the sensed amount of current drawn through the device to compute a load-line voltage. At 94 it is determined whether the load-line voltage is less than a target supply voltage for the device. If the load-line voltage is not less than the target supply voltage—i.e., the target voltage is less than the load-line voltage, then the method advances to 96, where the supply voltage is regulated to the target voltage.

Even while the supply voltage is being regulated to the target supply voltage, short-term excursions in supply voltage remain possible. For instance, the supply voltage may be increased in response to increasing clock lag in the device, as noted above. However, if the load-line voltage is less than the target supply voltage, then the supply voltage of the device, at 98, is regulated at the load-line voltage. In effect, the supply voltage is decreased when an amount of current drawn through the device exceeds an operational threshold. In some embodiments, the supply voltage may be decreased to a point at which instantaneous power dissipation in the device is below the EDP threshold. Execution of the method then proceeds to 100, where the clock frequency is adjusted based on the supply voltage. In particular, clock frequency of the device may be increased in response to increasing supply voltage and decreased in response to decreasing supply voltage, as describe above with respect to the function of first control system 34.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of dynamically scaling voltage and frequency of a device, comprising:
   sensing a supply current in a device;
   computing a load-line voltage by dividing a peak power dissipation rating of the device by the supply current, wherein the load-line voltage decreases as the supply current increases;
   regulating a supply voltage of the device at a target voltage when the load-line voltage is greater than the target voltage, wherein the target voltage is configurable and set based on a parameter provided externally from the device;
   regulating the supply voltage of the device at the load-line voltage when the load-line voltage is less than the target voltage, wherein regulating the supply voltage at the load-line voltage operates the device at the peak power dissipation rating of the device; and
   setting a clock frequency for the device based on the supply voltage, wherein the clock frequency decreases as the supply voltage decreases and the clock frequency increases as the supply voltage increases.

2. The method of claim 1, wherein the setting of the clock frequency for the device includes:
   comparing a reference clock to a clock-pulse train generated by a delay line controlled by the supply voltage of the device.

3. The method of claim 2, wherein:
   the clock-pulse train is delivered to a clock distribution tree of the device, and
   the comparing is performed by a proportional integrated/derivative control unit and a counter to divide the clock-pulse train.

4. The method of claim 1, wherein the regulating of the supply voltage of the device at either the load-line voltage or the target voltage is performed by a buck inductor acting a switch mechanism.

5. The method of claim 4, wherein the buck inductor is charged and discharged by a pair of power field-effect transistors (FETs) whose gates are biased by a power FET driver.

6. The method of claim 5, wherein the power FET driver is controlled by a waveform provided by a waveform generator controlled by input slew rate parameters.

7. The method of claim 1, wherein the regulating of the supply voltage of the device at either the load-line voltage or the target voltage includes computing a difference between either the load-line voltage or the target voltage and a pre-regulated supply voltage.

8. A device, comprising:
   a power management unit (PMU) configured to:
      sense a supply current in the device;
      compute a load-line voltage by dividing a peak power dissipation rating of the device by the supply current, wherein the load-line voltage decreases as the supply current increases;
      regulate a supply voltage of the device at a target voltage when the load-line voltage is greater than the target voltage, wherein the target voltage is configurable and set based on a parameter provided externally from the device;
      regulate the supply voltage of the device at the load-line voltage when the load-line voltage is less than the target voltage, wherein regulating the supply voltage at the load-line voltage operates the device at the peak power dissipation rating of the device; and
      set a clock frequency for the device based on the supply voltage, wherein the clock frequency decreases as the supply voltage decreases and the clock frequency increases as the supply voltage increases.

9. The device of claim 8, wherein the PMU is further configured to:
   compare a reference clock to a clock-pulse train generated by a delay line controlled by the supply voltage of the device.

10. The device of claim 9, wherein:
    the clock-pulse train is delivered to a clock distribution tree of the device, and
    the comparison is performed by a proportional integrated/derivative control unit and a counter to divide the clock-pulse train.

11. The device of claim 8, wherein the regulation of the supply voltage of the device at either the load-line voltage or the target voltage is performed by a buck inductor acting a switch mechanism.

12. The device of claim 11, wherein the buck inductor is charged and discharged by a pair of power field-effect transistors (FETs) whose gates are biased by a power FET driver.

13. The device of claim 12, wherein the power FET driver is controlled by a waveform provided by a waveform generator controlled by input slew rate parameters.

14. The device of claim 8, wherein the PMU is further configured to:
    compute, in regulating the supply voltage, a difference between either the load-line voltage or the target voltage and a pre-regulated supply voltage.

* * * * *